United States Patent
Nuzzi (10) Patent No.: US 10,629,190 B2
(45) Date of Patent: Apr. 21, 2020

(54) HARDWARE COMMAND DEVICE WITH AUDIO PRIVACY FEATURES

(71) Applicant: PAYPAL, INC., San Jose, CA (US)

(72) Inventor: Frank Anthony Nuzzi, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 68 days.

(21) Appl. No.: 15/808,553

(22) Filed: Nov. 9, 2017

(65) Prior Publication Data

US 2019/0139539 A1   May 9, 2019

(51) Int. Cl.
| | | |
|---|---|---|
| *G10L 21/00* | (2013.01) | |
| *G10L 21/06* | (2013.01) | |
| *G10L 25/00* | (2013.01) | |
| *G10L 15/18* | (2013.01) | |
| *G06F 21/32* | (2013.01) | |
| *G06F 21/62* | (2013.01) | |
| *H04L 29/06* | (2006.01) | |
| *G10L 15/07* | (2013.01) | |

(Continued)

(52) U.S. Cl.
CPC .......... *G10L 15/1822* (2013.01); *G06F 3/167* (2013.01); *G06F 16/243* (2019.01); *G06F 21/32* (2013.01); *G06F 21/6245* (2013.01); *G10L 15/07* (2013.01); *H04L 63/0861* (2013.01); *G06N 20/00* (2019.01); *H04M 2201/405* (2013.01)

(58) Field of Classification Search
CPC ............. G06F 21/31; G06F 2221/2113; G06F 2221/2149; G06F 21/32; G06F 16/00; H04M 3/493; H04M 2203/609
See application file for complete search history.

(56) References Cited

U.S. PATENT DOCUMENTS

| | | | | |
|---|---|---|---|---|
| 8,583,553 B2 * | 11/2013 | Cohen | ................... | G06Q 30/04 705/35 |
| 8,732,821 B1 * | 5/2014 | Spertus | ................... | G06F 21/31 713/182 |

(Continued)

OTHER PUBLICATIONS

CBS News, "If Amazon starts sharing Alexa recordings, should we be concerned?", Jul. 14, 2017, 12:30 PM; CBS Interactive Inc., [retrieved on Oct. 28, 2017]. Retrieved from the Internet: <URL: http://www.cbsnews.com/news/amazon-echo-alexa-voice-activated-device-privacy-concerns/>.

(Continued)

*Primary Examiner* — Olujimi A Adesanya
(74) *Attorney, Agent, or Firm* — Haynes and Boone, LLP (57) ABSTRACT

A hardware device may receive a command from a user and then respond to that command with information. Such commands may cause an audible response to be broadcast via speaker. A device's audio reply to a command may include sensitive details that a person may not wish to share. When a device makes such an audio reply, it may therefore divulge sensitive information to one or more other people that are in listening range. A person utilizing such a device may thus inadvertently compromise his own privacy. The present disclosure includes techniques that are usable to mitigate such privacy exposures by detecting a presence of a second person in a surrounding environment and creating a reply that omits some or all of the sensitive information that might have otherwise been broadcast by a command device.

20 Claims, 6 Drawing Sheets

(51) Int. Cl.
*G06F 16/242* (2019.01)
*G06F 3/16* (2006.01)
*G06N 20/00* (2019.01)

(56) References Cited

U.S. PATENT DOCUMENTS

| | | | | |
|---|---|---|---|---|
| 8,929,208 | B2* | 1/2015 | Cohen | H04L 51/12 |
| | | | | 370/229 |
| 9,307,084 | B1* | 4/2016 | Pycko | H04M 3/5166 |
| 9,544,438 | B1* | 1/2017 | Andraszek | H04M 3/568 |
| 9,898,610 | B1* | 2/2018 | Hadsall | G06F 21/6245 |
| 9,946,895 | B1* | 4/2018 | Kruse | G06F 21/6245 |
| 10,482,281 | B1* | 11/2019 | Abdi Taghi Abad | |
| | | | | H04L 9/3226 |
| 2004/0125922 | A1 | 7/2004 | Specht | |
| 2004/0162026 | A1 | 8/2004 | Hong | |
| 2004/0208324 | A1 | 10/2004 | Cheung et al. | |
| 2004/0209654 | A1 | 10/2004 | Cheung et al. | |
| 2004/0252654 | A1 | 12/2004 | Arnold et al. | |
| 2007/0135176 | A1 | 6/2007 | Ho et al. | |
| 2007/0192910 | A1 | 8/2007 | Vu et al. | |
| 2007/0198128 | A1 | 8/2007 | Ziegler et al. | |
| 2007/0199108 | A1 | 8/2007 | Angle et al. | |
| 2007/0287516 | A1 | 12/2007 | Cheung et al. | |
| 2009/0156249 | A1 | 6/2009 | Ruckart | |
| 2009/0177323 | A1 | 7/2009 | Ziegler et al. | |
| 2009/0298430 | A1 | 12/2009 | Cheung et al. | |
| 2010/0034451 | A1 | 2/2010 | Hughes | |
| 2011/0218798 | A1* | 9/2011 | Gavalda | G10L 15/04 |
| | | | | 704/201 |
| 2011/0313922 | A1* | 12/2011 | Ben Ayed | G06Q 20/108 |
| | | | | 705/42 |
| 2012/0159323 | A1 | 6/2012 | Marlow | |
| 2012/0303160 | A1 | 11/2012 | Ziegler et al. | |
| 2013/0174381 | A1 | 7/2013 | McClellan | |
| 2013/0210496 | A1 | 8/2013 | Zakarias et al. | |
| 2013/0279744 | A1* | 10/2013 | Ingrassia, Jr. | G06F 21/32 |
| | | | | 382/103 |
| 2014/0003674 | A1* | 1/2014 | Coley | G06K 9/00382 |
| | | | | 382/115 |
| 2014/0006017 | A1* | 1/2014 | Sen | G10L 21/003 |
| | | | | 704/208 |
| 2014/0064526 | A1 | 3/2014 | Otto et al. | |
| 2014/0095153 | A1 | 4/2014 | de la Guardia Gonzales | |
| 2014/0126757 | A1 | 5/2014 | Davis | |
| 2015/0036835 | A1 | 2/2015 | Chen | |
| 2015/0135101 | A1* | 5/2015 | Ellis | G06F 16/9038 |
| | | | | 715/762 |
| 2015/0137998 | A1 | 5/2015 | Marti et al. | |
| 2015/0172294 | A1* | 6/2015 | Bittner | G06F 16/00 |
| | | | | 726/4 |
| 2015/0224640 | A1 | 8/2015 | Vu et al. | |
| 2015/0244682 | A1* | 8/2015 | Biswas | G06F 3/0481 |
| | | | | 726/26 |
| 2015/0334478 | A1 | 11/2015 | Nguyen | |
| 2016/0182464 | A1 | 6/2016 | Mintz | |
| 2016/0203331 | A1* | 7/2016 | Khan | G06F 21/6254 |
| | | | | 726/1 |
| 2016/0336022 | A1 | 11/2016 | Florencio et al. | |
| 2016/0379621 | A1 | 12/2016 | Marti et al. | |
| 2017/0171671 | A1* | 6/2017 | Smith | H04R 25/505 |
| 2017/0180984 | A1 | 6/2017 | Thomas et al. | |
| 2017/0294072 | A1 | 10/2017 | Achmuller et al. | |
| 2018/0285592 | A1* | 10/2018 | Sharifi | G06F 21/6245 |
| 2019/0082305 | A1* | 3/2019 | Proctor | H04W 4/10 |

OTHER PUBLICATIONS

Nield, David, "How to Lock Down Your Privacy on the Amazon Echo and Google Home". Apr. 27, 2017, 10:20 A.M., Retrieved from the Internet: <URL: http://fieldguide.gizmodo.com/how-to-lock-down-your-privacy-on-the-amazon-echo-and-go-1794697554>.

* cited by examiner

FIG. 1

| Event ID | Account ID | Type | IP Address | Transaction Amt | Timestamp |
|---|---|---|---|---|---|
| 798744654 | 1234 | Debit | 173.0.88.2 | $5.48 | 20170428134751 |
| 345235896 | 5678 | ACH | 172.217.11.228 | $89.98 | 20170301002133 |
| 563454210 | 7890 | Balance | 128.42.206.11 | $2.00 | 20161225200205 |
| 98234771 | 5678 | CC | 104.20.84.19 | $323.42 | 20170301000917 |
| 202 | 204 | 206 | 208 | 210 | 212 |

Records 200

HARDWARE COMMAND DEVICE WITH AUDIO PRIVACY FEATURES

TECHNICAL FIELD

This disclosure relates to hardware devices that are configured to respond to verbal commands with audio replies, and more particularly, to data privacy features usable with such devices, in various embodiments.

BACKGROUND

Greater amounts of information than ever before are now digitally accessible. At the same time, the expanding universe of digital devices means that there are more ways to access such information than ever before. Thus, possibilities for breaches of privacy are increasing.

DETAILED DESCRIPTION

A variety of devices may receive a command from a user and then respond to that command with information. For example, a user might tell a device (via microphone) to "cancel my 10 am meeting" or ask "what time is my flight tomorrow morning?" The device may then take an action such as removing a meeting from a user's calendar, or searching email and/or calendar records to provide the flight information to the user. The device may then make an audio response to the user, e.g., "your 10 am meeting is canceled, and attendees have been emailed the cancelation" or "your flight to Boston tomorrow leaves at 7:45 am". Non-verbal commands that generate an audio response may also be issued. Note that some devices that receive user commands may be shared devices used by multiple people, e.g., a device in a home, office, or other building that can be accessed by various users (who may or may not have particular profiles and defined privileges on the device).

In some cases, however, a device's audio reply to a command may include sensitive details that a person may not wish to share with others (e.g., financial information, health information, scheduling information, etc.). When a device makes such an audio reply, it may divulge sensitive information to one or more other people that are in listening range. A person utilizing such a device may therefore inadvertently compromise his own privacy.

The present disclosure includes techniques that are usable to mitigate such privacy exposures by detecting a presence of a second person in a surrounding environment and creating an audio reply that omits some or all of the sensitive information that might have otherwise been broadcast by a command device.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
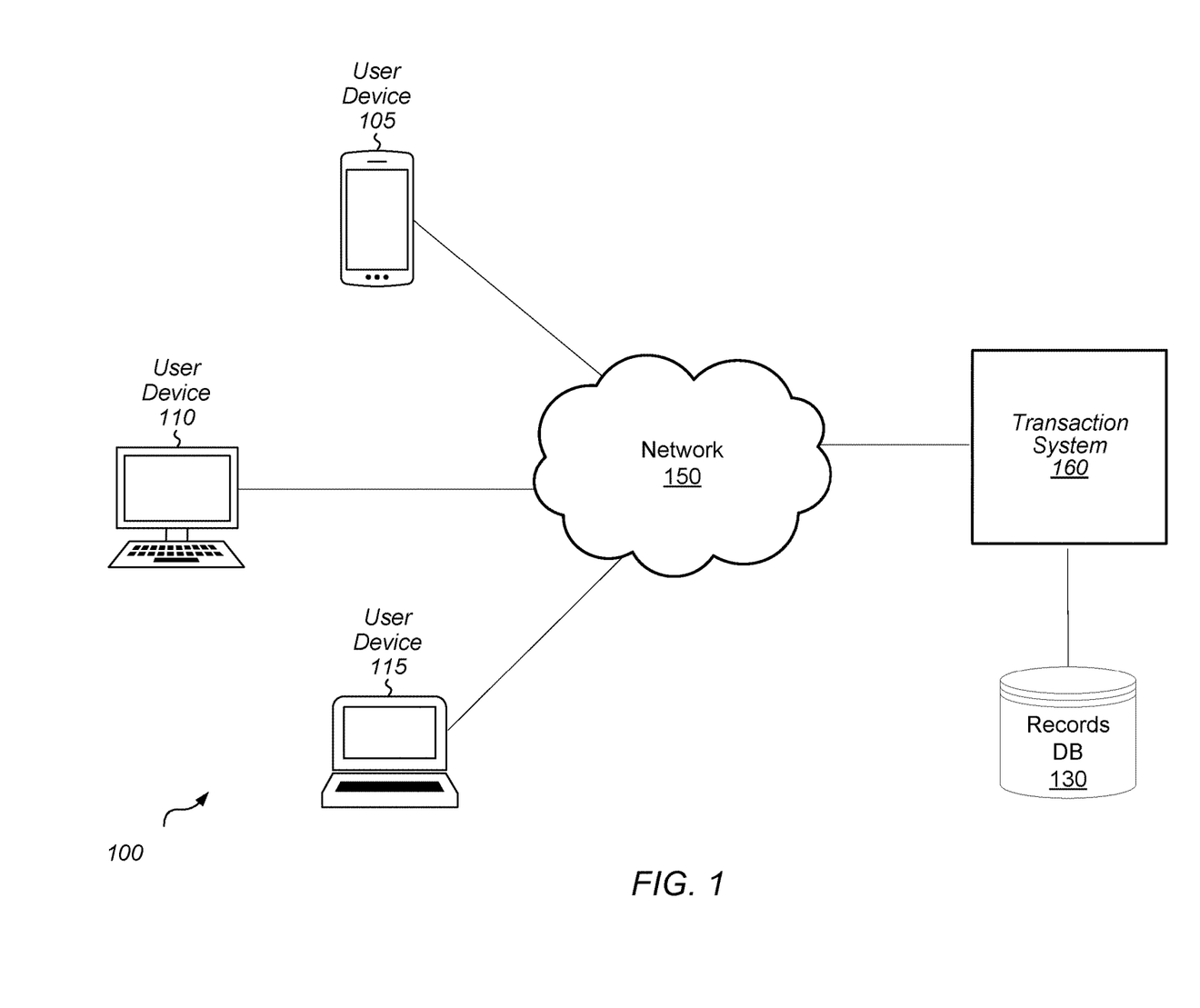
FIG. 1 illustrates a block diagram of a system that includes users devices, a transaction system, a network, and a records database according to some embodiments.

Turning to FIG. 1, a block diagram of a system 100 is shown. In this diagram, system 100 includes user devices 105, 110, 115, a transaction system 160, and a network 150. Also depicted is records DB (database) 130.

FIG. 1 relates, in various embodiments, to an architecture allowing for electronic payment transactions. Further below, however, will be more detailed discussion regarding device commands, device replies, and privacy protections. In some cases, information from transaction system 160 (or another device in FIG. 1) could be used to determine that sensitive information is present in the form of financial data.

Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

User devices 105, 110, and 115 may be any type of computing device. Thus, these devices can be a smartphone, laptop computer, desktop computer, tablet computer, etc. As discussed below, user devices such as 105, 110, and 115 may engage in various actions, including transactions, using transaction system 160. Network 150 may comprise all or a portion of the Internet.

Transaction system 160 may correspond to an electronic payment service such as that provided by PayPal™. Transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 105, 110, and 115 can be used to access electronic payment accounts such as those provided by PayPal™ In various embodiments, quantities other than currency may be exchanged via transaction system 160, including but not limited to stocks, commodities, gift cards, incentive points (e.g. from airlines or hotels), etc.

Records database (DB) 130 includes records related to various users. These may be users of transaction system 160 in some instances and can include any number of details, such as any information related to a transaction or to an action taken by a user on a web page or an application installed on a computing device (e.g., the PayPal app on a smartphone). Many or all of the records in records database 130 are transaction records including details of a user sending or receiving currency (or some other quantity, such as credit card award points, cryptocurrency, etc.).

Figure 2:
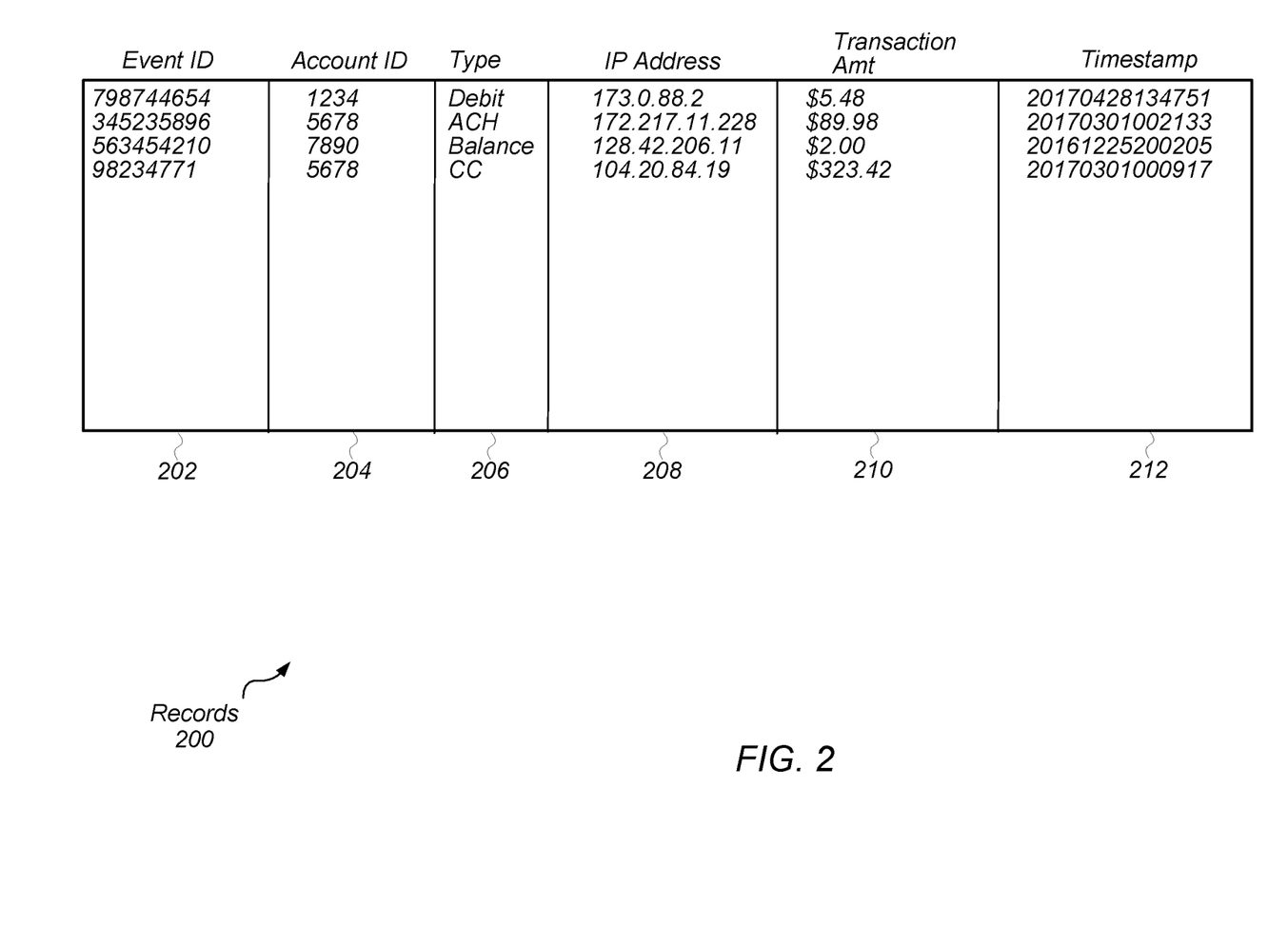
FIG. 2 illustrates a block diagram of a set of data records, according to some embodiments.

Turning to FIG. 2, a block diagram is shown of one embodiment of records 200. These records may be contained in records database 130, for example. In this example, the records shown include various charges made by different funding mechanisms.

As shown, field 202 includes an event ID. This may be a globally unique event identifier within an enterprise associated with transaction system 160. Thus, in one embodiment, the event ID in field 202 includes a unique ID for each of millions of electronic payment transactions processed by a service provider such as PayPal™. Field 204 includes a unique account ID for a user.

Field 206 includes type of transaction. In this example, rows 1 and 4 are a credit card ("CC") funded transaction, while row 2 is an Automated Clearinghouse (ACH) funded transaction. Row 3 is a balance funded transaction (e.g. a user had a pre-existing currency balance in her account that was used to pay another entity). Additional types of transactions and/or more specific information is also possible in various embodiments (e.g., different types of credit card networks could be specified, such as VISA™ or MASTER-CARD™).

Fields 208 and 210 represent an IP address date and a transaction amount (which may be specified in a particular currency such as US Dollars, Great Britain Pounds, etc.). The transaction amount can also be cryptocurrency or another quantity as well (e.g. airline or other rewards points) in various embodiments. The IP address might be the IP address of the user at the time the transaction was conducted, for example. Field 212 includes a transaction timestamp. In the examples shown, the timestamps are in the format (year) (two-digit month) (two-digit day) (hour) (minute) (seconds), but may be in any other format in various embodiments.

Many additional pieces of information may be present in records database 130 in various embodiments. An email address associated with an account (e.g. which can be used to direct an electronic payment to a particular account using only that email address) can be listed. Home address, phone number, and any number of other personal details can be listed. Further, in various embodiments, databases may include event information on actions associated payment transaction, such as actions taken relative to a website, or relative to an application installed on a device such as the PayPal application on a smartphone. Database information can therefore include web pages visited (e.g., did a user travel to www.PayPal.com www.eBay.com, or from some other domain?), order in which the pages were visited, navigation information, etc. Database information can include actions taken within an application on a smartphone such as the PayPal™ app. Database information can also include a location of where a user has logged into (authenticated) an account; unsuccessful login attempts (including IP address etc.); time of day and/or date of week for any event mentioned herein; funding sources added or removed and accompanying details (e.g. adding a bank account to allow currency to be added to or withdrawn from a user account), address or other account information changes, etc. Reversal status of a transaction (e.g. not reversed, reversed due to fraud, reversed due to NSF, etc.).

Figure 3:
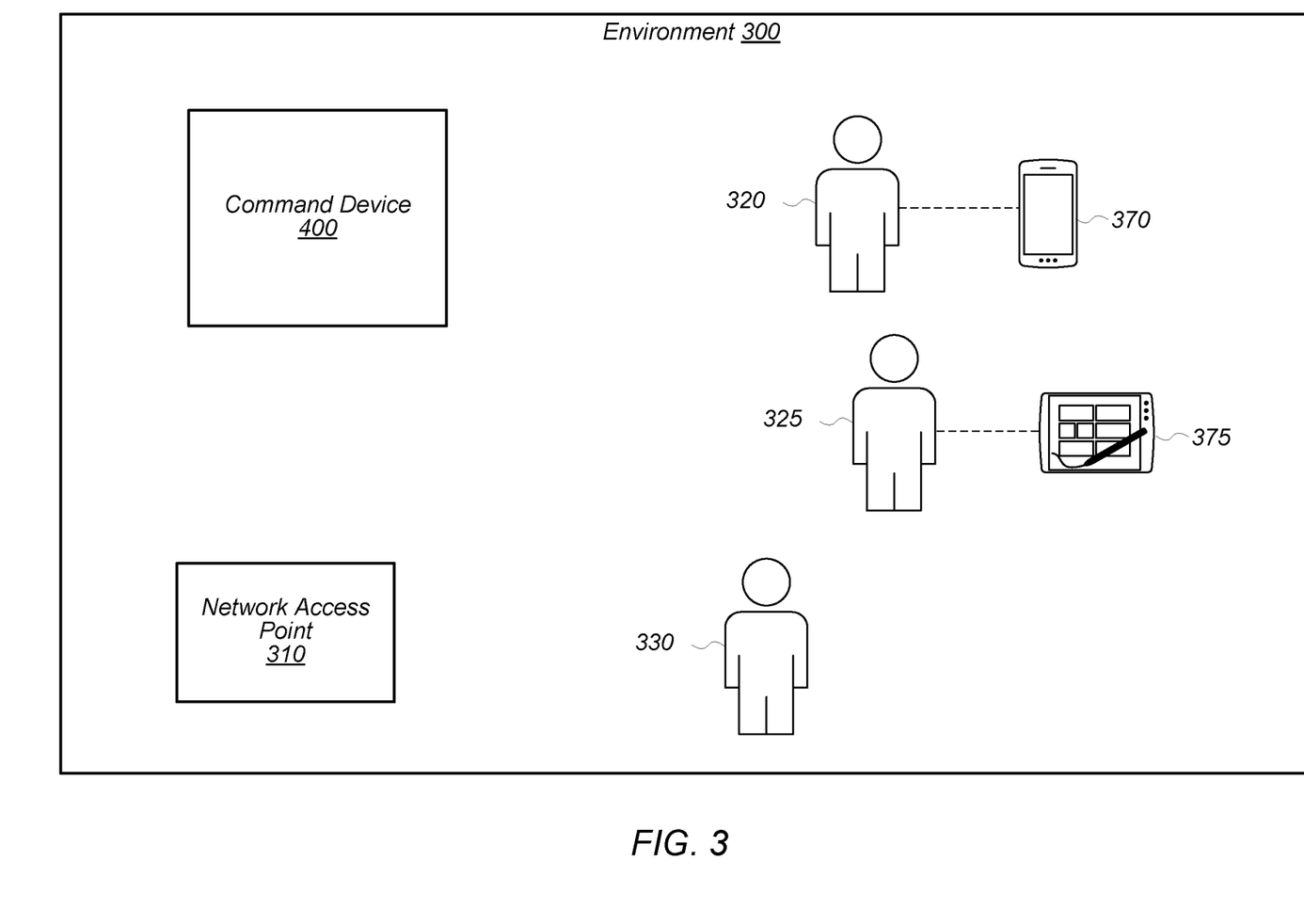
FIG. 3 illustrates a block diagram of an environment include various persons and devices, according to some embodiments.

Turning now to FIG. 3, a block diagram is shown illustrating an environment 300 that includes various devices and persons, according to some embodiments. Environment 300 may be any area indoors and/or outdoors, including but not limited to homes, vehicles, offices, backyards, etc.

Environment 300 includes command device 400, which is described further below relative to FIG. 4. As shown, environment 300 also includes persons 320, 325, and 330, as well as mobile devices 370 and 375. Network access point 310 is shown as well, and may allow wired and/or wireless network access (e.g. to the Internet, an intranet, and/or any other network).

Mobile devices 370 and 375 may be a smartphone, laptop, tablet, or other device having a processor and memory. As shown, mobile device 370 is associated with person 320 while mobile device 375 is associated with person 325. Note that greater or fewer persons and/or devices may be present in various embodiments of environment 300.

As explained below, a person in environment 300 may issue commands to command device 400. These commands are issued via speech, in various embodiments (e.g. "command device, please tell me the last transaction I made on my PayPal™ account"). In other instances the commands could be issued via typing, device touch, gesture, or other mechanisms. Command device 400 may reply via audio to these commands. Sometimes these replies may contain sensitive information, however, that a user may not wish to share with others. Thus, techniques disclosed herein may prevent such sensitive information from being broadcast.

Figure 4:
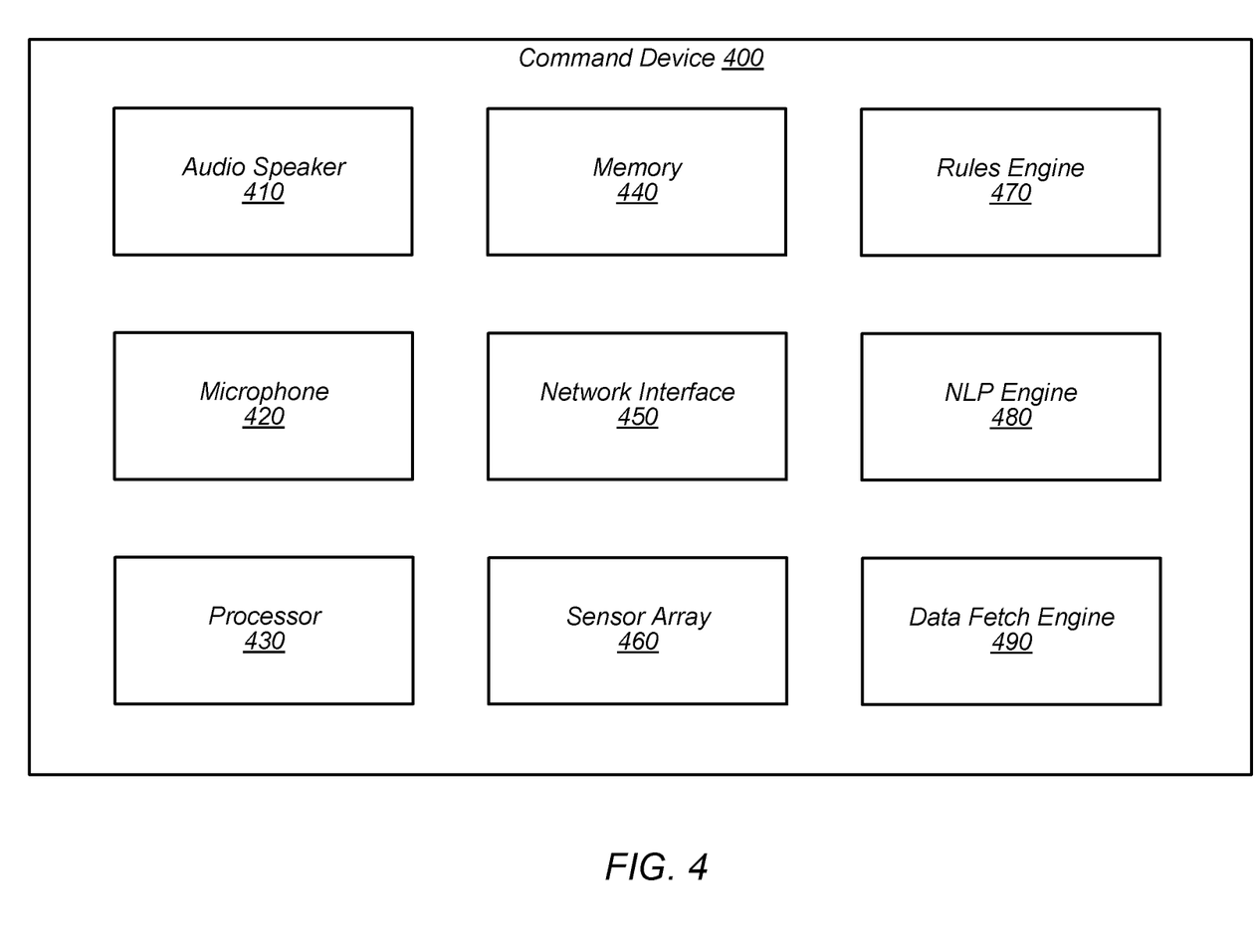
FIG. 4 illustrates a block diagram of a command device, according to some embodiments.

Turning to FIG. 4, a block diagram is shown of a command device 400, according to various embodiments. Command device 400 may be any suitable type of digital device, and may include some or all of the features described relative to the system of FIG. 7. As shown, command device 400 includes an audio speaker 410, microphone 420, processor 430, memory 440, network interface 450, sensory array 460, rules engine 470, natural language processing (NLP) engine 480, and data fetch engine 490. In various embodiments, however, command device 400 may be configured differently (e.g. one or more components shown may be omitted, and one or more additional components may be added). Command device 400 may be a mobile smartphone, a laptop, a tablet, and/or a custom purpose hardware device (e.g. AMAZON ECHO™).

Command device 400 is configured to receive commands and formulate replies, in various embodiments. These commands may be verbal commands received via microphone 420 (or commands may be received via other mechanisms as well, such as through network interface 140 or another type of interface). Command device 400 can give replies to commands via audio speaker 410, which can broadcast audio sounds into environment 300.

Sensory array 460 may contain one or more sensors configured to help determine the presence and/or identity of persons in a surrounding environment. These sensors could include wireless networking sensors (e.g. Bluetooth) as well as sonar and/or body heat sensors, in some embodiments.

Rules engine 470 may contain stored logic to determine if a reply to a command will contain sensitive information, and can determine to omit some or all of the sensitive information if a second person who may not be privileged to hear the information is present in environment 300. Rules engine 470 may therefore include one or more computer-executable instructions stored on a computer-readable medium (which may be part of memory 440 and/or another component).

NLP engine 480 and data fetch engine 490 may likewise include one or more computer executable instructions.

NLP engine 480 is configured to parse natural language, in various embodiments, to determine a query inside the language. This can include parsing spoken language or written language. NLP engine 480 can determine one or more queries contained in a command. NLP engine 480 can likewise determine one or more data sources necessary to answer the one or more queries, and can communicate with data fetch engine 490 in order to cause data fetch engine 490 to acquire the data necessary to execute a command and/or generate a reply. Data fetch engine 490 may access locally stored data, or data on any other system (e.g., a web server, local or remote database, a device such as mobile device 370, etc.).

Figure 5:
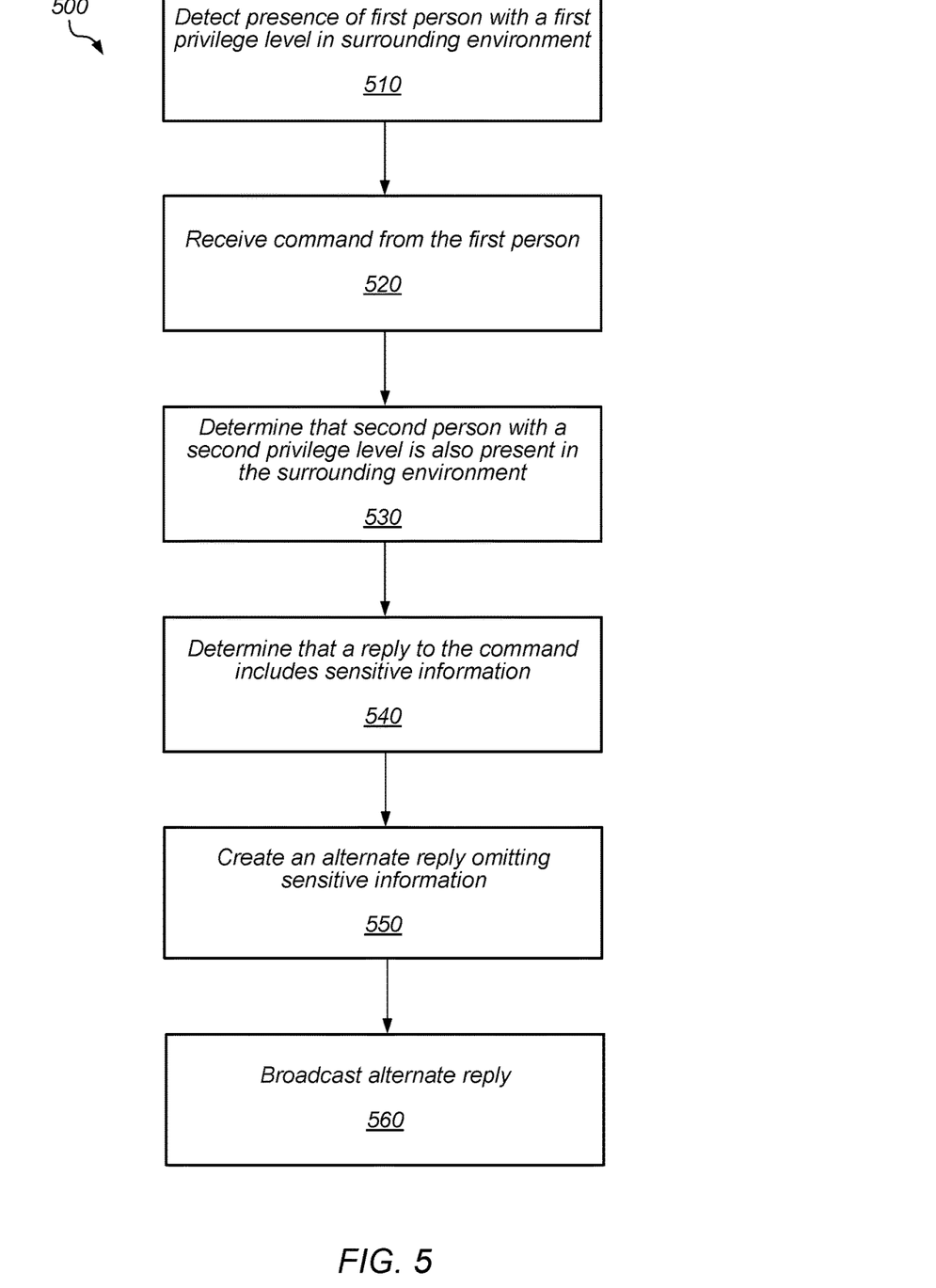
FIG. 5 a flow diagram of a method that relates to training and operating a machine learning model while preserving underlying causative information for a prediction made by the machine learning model, according to some embodiments.

Turning to FIG. 5, one embodiment of a method 500 that relates to determining that a second person is present in a surrounding environment, determining that a reply to a command includes sensitive information, and creating an alternate reply that includes less than all of the sensitive information, according to various embodiments.

Operations described relative to FIG. 5 may be performed, in various embodiments, by any suitable computer system and/or combination of computer systems, including command device 400. (For convenience and ease of explanation, operations described below will be discussed relative to this device). Various elements of operations discussed below may also be modified, omitted, and/or used in a different manner or different order than that indicated.

In operation 510, command device 400 detects the presence of a first person in a surrounding environment, in various embodiments. The first person may have a particular first privilege level for command device 400.

The presence of the first person may be detected in a variety of ways. In some instances, the first person is detected based on their voice signature, e.g., command device 400 may recognize the pattern of the person's voice to determine their identity (and this pattern may be recognized within a voice command itself). The first person can also be detected based on the presence of an associated device, such as mobile device 370. For example, mobile device 370 may be registered with command device 400 and then detected via Bluetooth or another wireless mechanism. A special purpose hardware device (e.g. a hardware fob) can also be used to detect the presence of the first person. In some cases, yet another device may alert command device 400 to the presence of the first person, e.g., a building security system may communicate that a first person has entered a building via an authorized mechanism (RFID badge, PIN, etc.). A first person might thus also authenticate to a laptop computer or mobile device via biometric or other means, and that device can tell command device 400 that the first person authenticated within some prior timeframe (e.g. 30 seconds, 5 minutes, etc.). In various embodiments, one or more mechanisms may be combined to detect the first person. For example, presence of a mobile phone device associated with the first person, along with a voice print having some degree of confidence match (e.g. 70% match or some other number) can serve to detect the presence of the first person.

A first privilege level of the device may correspond to the first person detected by command device 400. For example, the first person may be an owner/authorized user of command device 400. The first person may set up a profile on command device 400 with various privileges and/or restrictions. In some cases, the first person may have unlimited access to information available to command device 400, while in other cases, the first person may have limits on what they can access. In some instances, these limits may be enforced by remote devices.

In operation 520, command device 400 receives a command from the first person in various embodiments. This command may be received as a verbal command via a microphone of command device 400, but can also be received directly via command device 400 or indirectly from another device.

In operation 530, command device 400 determines that a second person is also present in the surrounding environment, in various embodiments. The second person may have a second privilege level for the command device that is different from the first privilege level possessed by a first person.

The second person may be detected by command device 400 in any of the ways listed above for detecting the first person (e.g. in operation 510)—and the first person can likewise be detected in ways discussed below.

The second person may be detected based on passive sensory input, in some cases, in which the second person does not affirmatively identify himself to command device 400. That is, the second person need not answer a query from command device 400 or send a direct communication to command device 400 in order to be identified.

In one embodiment, the passive sensory input includes background audio received by the microphone of command device 400. For example, command device may monitor sound in its surrounding environment and determine that a second person is present based on a different voice pattern.

In another embodiment, the passive sensory input used to detect the second person can be a body heat signature received via a body heat sensor that is a part of command device 400 (or another device located in the surrounding environment that communicates with the command device). In some cases, this may be as simple as detecting that there are two human bodies in a room, but only one of them is known to command device 400 (e.g. the identified first person). In other cases, more sophisticated heat detection algorithms can be used to analyze body mass and/or heat. Spatial detection can also be used in some instances to detect the presence of the second person, and this technique can be combined with body heat signature detection (e.g. determine location/direction/distance of a body heat signature against the ambient environment by calculating temperature differential over a particular area).

Sonar/sonic pulses can also be used to determine presence of persons via echolocation and related techniques. A command device can map its surroundings for example using sonic pulses (which may be at frequencies inaudible to humans in some cases) and then once a baseline reference point is established, determine if two or more people are in a room.

In yet another embodiment, passive sensory input used to detect the second person can be a wirelessly detected via a device possessed by the second person. Thus if mobile device 375 can be detected (via Bluetooth, wifi connection on a network, or any other mechanism) then the presence of a second person can be inferred.

The second device privilege level for the second person can be a variety of different privilege levels. In some cases, the second person may be simply be considered "unknown" by the device, and deemed to have a privilege level for an unknown and/or unauthenticated person.

In other instances, the second person may be assigned a contextual privilege level, even if their exact identity is not known. The contextual-based privilege level can be based on a location of the command device, in some instances. For example, if the command device is in a particular physical location, one or more categories for the second person might be inferred. If the command device is in the bedroom of a home, for example, the second person might be deemed as a family member or close friend. If the command device is located in an office, an otherwise unknown person might be considered to have a "coworker" privilege level. Contextual privilege levels can also be determined based on time of day (e.g., a second person in a bedroom at 2 A.M. might be deemed to have family member status). Thus, a privilege level can be for a category of persons.

Generally, many different privilege levels can be defined within command device 400, spanning from complete to partial to no access. These privilege levels can optionally be customized by an end user in various embodiments.

A second user can also be specifically identified according to various techniques discussed above (e.g. voice print, etc.). In this case, a privilege level for the second person can be defined for that individual (e.g. a parent could set up a specific privilege level for a child).

The privilege level of a person defines what types of information that person should be permitted to hear, in various embodiments. In simplified cases, command device may simply distinguish between the presence of a first person issuing a command and a second person who is not the first person (e.g. the only two privilege levels are essentially "current user" and "person other than current user"). In other cases, categories of information and other restrictions can be defined for different privilege levels. Thus, someone with "co-worker" privilege level could be deemed as acceptable to hear schedule/calendar details between 8:00 A.M. and 6:30 P.M. on weekdays, but not at other times. (Thus a user who asks a command device "what's on my calendar for Saturday night?" might receive an edited reply if someone with co-worker privilege level is in the vicinity of the user.)

In operation 540, command device 400 determines that a reply from the device to command includes sensitive information, in various embodiments. Determining that a reply includes sensitive information can be based on a rules engine, in some instances.

Sensitive information can include health information, financial information, or other types of information. Default categories and rules for determining sensitive information may be included with command device 400 in various embodiments (e.g. within rules engine 470). Rules engine 470 may also be able to determine a category of information based on a source of the information. E.g., a doctor's office, testing laboratory, or other medical establishment might leave a telephone voice mail with a user who then asks a device to play her the message. The phone number of the caller could be cross-referenced to a database having information about businesses to determine that the voicemail message may include sensitive information. In other cases, particular web sites and/or databases can be categorized as having sensitive information (e.g. an email website, a database with personal investment information).

In some embodiments, sensitive information can be determined based on feedback acquired from end users and/or machine learning. E.g., after a user submits a command to command device 400, and the user receives a reply, the user could be asked a follow-up question of "did this answer contain sensitive/private information that you wouldn't want someone else to overhear?" (or some other similar question). The user could be asked "did this reply contain health information, sensitive scheduling information, financial information, family details, or another type of sensitive information?" and based on use replies, the original reply from command device 400 could be categorized as sensitive/non-sensitive and/or into one or more specific categories. Users could be incentivized (e.g. rewards points, currency, etc.) to provide such feedback in various instances, by a service provider associated with command device 400. Types of information and/or information sources can also be labeled by researchers manually assessing various examples of such.

Machine learning techniques can be further utilized to determine whether a reply to a command includes sensitive information. An artificial neural network (ANN), gradient boosting tree (GBT) or other type of artificial intelligence model can be used to classify replies into one or more categories of sensitive information.

Sensitive information can also be defined by a user of command device in various embodiments as well. A first person could interface with command device 400 by instructing it "do not read emails out loud from person 375 in the presence of person 370" or "do not read emails out loud at work if those emails contain profanity or sexual content". Countless different types of customization are possible.

In operation 550, command device 400 creates an alternate reply that omits some or all of the sensitive information, in various embodiments. The content of the alternate reply may be based on a second privilege level for the second person and on the specific details of the sensitive information.

A first person might ask "what were my last 5 credit card transactions?" The reply from command device 400 might include the name of the merchant, the city, the date/times, and the dollar amounts of the transactions. An alternate reply, however, might simply list the city and date/times. The first person could then be prompted on whether they wish to hear additional information (e.g. merchant name, transaction amount, transaction details such as items ordered). For example, a person might remember from the date and location of a transaction that he had bought a surprise gift for his spouse. If the spouse is in the room, the surprise need not be ruined. The first person also might not want to reveal exact transaction amounts in the presence of someone else.

An alternate reply could also wholly omit the sensitive information in the original reply. For example, a first user could be asked by command device 400 "Do you want me to read the information from XYZ Pharmacy out loud? It may contain sensitive health information". The user can then give a yes or no answer to the command device, and the original reply can still be audibly broadcast if desired. Such techniques may present a user from inadvertently disclosing sensitive/private information to a third party.

Thus, in operation 560, in various embodiments, command device 400 responds to the verbal command by using its speaker to broadcast the alternate reply to the surrounding environment. The user can further interact with the command device, as the alternate reply may contain additional prompts for the user.

In one embodiment, however, command device 400 may reply to a personalized accessory rather than broadcasting a reply via speaker. If a first person is wearing headphones, for example, command device may be able to transmit the reply to the headphones so that only the first person (and not a second nearby person) hears the reply. This type of private audio transmission can be accomplished in a variety of ways, including directing an audio transmission to a mobile device (e.g. smartphone) connected to the headphones, to another networked device connected to the headphones, or directly to the headphones themselves in some instances. Command device 400 may therefore query and/or receive information about headphone connectivity and use this information to determine the form of its reply. In cases where command device is replying to a private accessory such as headphones, it may actually use the original reply (containing the sensitive information) rather than sending the alternate reply.

Computer-Readable Medium

Figure 6:
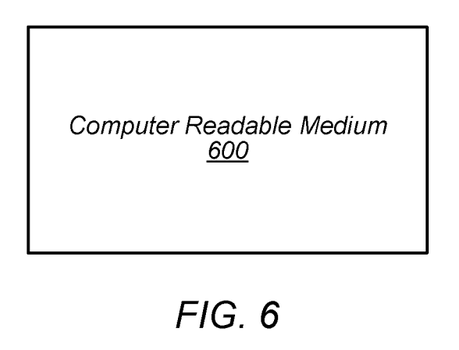
FIG. 6 is a diagram of a computer readable medium, according to some embodiments.

Turning to FIG. 6, a block diagram of one embodiment of a computer-readable medium 600 is shown. This computer-readable medium may store instructions corresponding to the operations of FIG. 5 and/or any techniques described herein. Thus, in one embodiment, instructions corresponding to command device 400 may be stored on computer-readable medium 600.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 7:
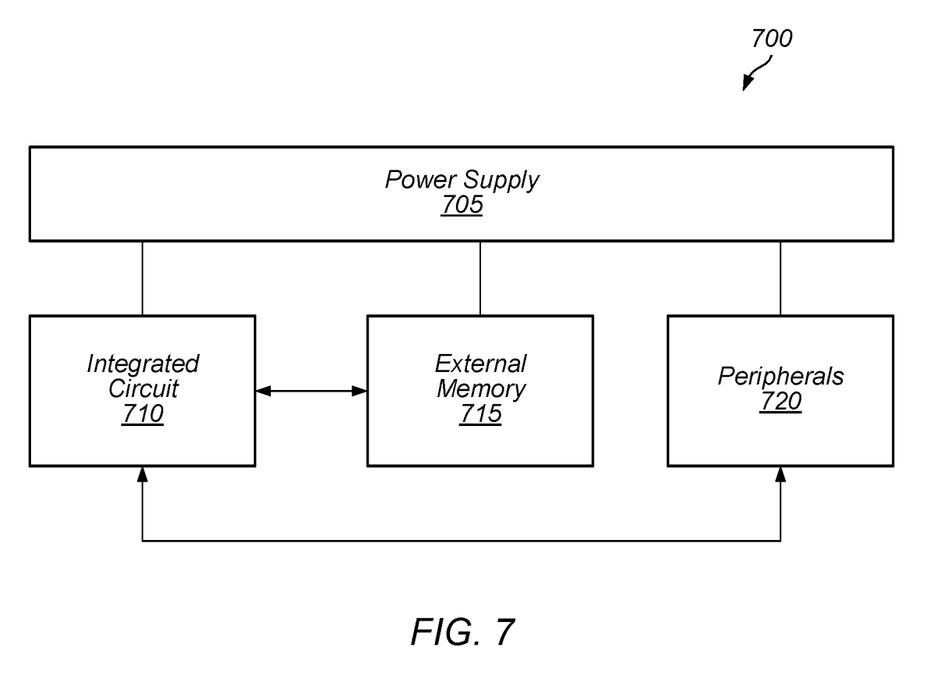
FIG. 7 is a block diagram of a system, according to some embodiments.

In FIG. 7, one embodiment of a computer system 700 is illustrated. Various aspects of this system may be included in command device 400, or any other computer system as discussed above and herein.

In the illustrated embodiment, system 700 includes at least one instance of an integrated circuit (processor) 710 coupled to an external memory 715. The external memory 715 may form a main memory subsystem in one embodiment. The integrated circuit 710 is coupled to one or more peripherals 720 and the external memory 715. A power supply 705 is also provided which supplies one or more supply voltages to the integrated circuit 710 as well as one or more supply voltages to the memory 715 and/or the peripherals 720. In some embodiments, more than one instance of the integrated circuit 710 may be included (and more than one external memory 715 may be included as well).

The memory 715 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 710 in a chip-on-chip configuration, a package-on-package configuration, or a multi-chip module configuration.

The peripherals 720 may include any desired circuitry, depending on the type of system 700. For example, in one embodiment, the system 700 may be a mobile device (e.g. personal digital assistant (PDA), smart phone, etc.) and the peripherals 720 may include devices for various types of wireless communication, such as wife, Bluetooth, cellular, global positioning system, etc. Peripherals 720 may include one or more network access cards. The peripherals 720 may also include additional storage, including RAM storage, solid state storage, or disk storage. The peripherals 720 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 720 may thus include any networking or communication devices necessary to interface two computer systems. Note that a computer system may in various embodiments include two or more computer systems networked together.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A device, comprising:
   a microphone configured to receive audio sounds from a surrounding environment;
   a speaker configured to project audio sounds to the surrounding environment;
   a processor; and
   a computer-readable medium having stored thereon instructions that are executable by the device to cause the device to perform operations comprising:
      detecting a presence of a first user and a second user in the surrounding environment;
      identifying a first account for the first user and a second account for the second user, wherein the first account and the second account are currently active accounts associated with the device;
      determining a first privilege level of the first user and a second privilege level of the second user for the device based on a first account configuration and a second account configuration, respectively;

receiving, via the microphone, a first verbal command from the first user;

determining, based on the first account configuration, that an audible reply to be broadcasted from the speaker of the device in response to the first verbal command includes a first type of information;

based on the second privilege level and content of the first type of information, broadcasting, using the speaker, an audible message to the surrounding environment indicating that the audible reply to be broadcasted includes the first type of information;

receiving a second verbal command from the first user indicating that an alternate audible reply is desired;

creating the alternate audible reply that includes less than all of the content of the first type of information; and responsive to the second verbal command, using the speaker to broadcast the alternate audible reply to the surrounding environment.

2. The device of claim 1, further comprising:
a wireless network interface, wherein the device is configured to access information from an Internet via the wireless network interface in response to the first verbal command.

3. The device of claim 1, wherein the detecting the presence of the first user and the second user is based on a passive sensory input in which the device does not receive affirmative identification data from the first user and the second user.

4. The device of claim 3, wherein the passive sensory input includes background audio received by the microphone; and
wherein the operations further comprise analyzing the background audio to determine that the second user is not the first user.

5. The device of claim 3, wherein the device further comprises a body heat sensor; and
wherein the passive sensory input includes a heat signature of the first user received via the body heat sensor and a heat signature of the second user received via the body heat sensor.

6. The device of claim 3, wherein the passive sensory input includes a wirelessly detected presence of a device associated with the first user and a device associated with the second user.

7. The device of claim 1, wherein the operations further comprise:
determining, based on content of the first verbal command, one or more remote information sources necessary to formulate the audible reply; and
obtaining, via a network, information from the one or more remote information sources to formulate the audible reply.

8. A method, comprising:
detecting, by a device including a processor and a speaker, a presence of a first user and a presence of a second user in a surrounding environment, the first user having first privilege levels for the device and the second user having second privilege levels of the device;
receiving, by the device, a command from the first user;
determining, by the device, that an audible reply to be broadcasted from the speaker of the device in response to the command includes a first type of information based on the second privilege level of the device;
based on the second privilege levels and the determining that the audible reply to the command includes the first type of information, broadcasting, using the speaker of the device, an audible message to the surrounding environment indicating that the audible reply to be broadcasted includes the first type of information;

receiving a second verbal command from the first user indicating that an alternate audible reply is desired;

creating the alternate audible reply that includes less than all of the first type of information; and using the speaker of the device to broadcast the alternate audible reply to the surrounding environment.

9. The method of claim 8, wherein the command is a verbal command received via a microphone configured to receive audio sounds from the surrounding environment.

10. The method of claim 8, further comprising determining that the first type of information includes health information.

11. The method of claim 8, further comprising determining that the first type of information includes financial information.

12. The method of claim 8, further comprising determining that the first type of information includes scheduling information.

13. The method of claim 8, wherein the determining that the audible reply to the command includes the first type of information is based further on one or more user-specified rules associated with the first user.

14. The method of claim 8, wherein the determining that the audible reply to the command includes the first type of information is based on a machine learning data set of replies to information feedback questions.

15. The method of claim 8, wherein the determining that the audible reply to the command includes the first type of information is based further on at least a portion of the first type of information originating from a particular data source.

16. A non-transitory computer-readable medium having stored thereon instructions that are executable by a system including a processor and a speaker to cause the system to perform operations comprising:
detecting a presence of a first user and a presence of a second user in a surrounding environment;
identifying a first account for the first user and a second account for the second user;
determining a first privilege level of the first user and a second privilege level of the second user for the system based on a first account configuration and a second account configuration, respectively;
receiving a command from the first user;
determining that an audible reply to be broadcasted from the speaker of the system in response to the command includes a first type of information;
based on the second privilege level and content of the first type of information, broadcasting, using the speaker of the system, an audible message to the surrounding environment indicating that the audible reply to be broadcasted includes the first type of information;
receiving a second verbal command from the first user indicating that an alternate audible reply is desired;
creating an alternate audible reply that includes less than all of the content of the first type of information; and
using the speaker of the system to broadcast the alternate audible reply to the surrounding environment.

17. The non-transitory computer-readable medium of claim 16, wherein the determining the second privilege level is based further on a current location of the system.

18. The non-transitory computer-readable medium of claim 16, wherein the detecting the presence of the first user and the second user in the surrounding environment is based on a passive sensory input in which the first user and the second user do not affirmatively identify themselves to the system.

19. The non-transitory computer-readable medium of claim 16, wherein the operations further comprise:
   determining, based on content of the command, one or more information sources necessary to formulate the audible reply; and
   obtaining, via a network, information from the one or more information sources; and
   formulating the audible reply based on the information from the one or more information sources.

20. The non-transitory computer-readable medium of claim 16, wherein the command is a verbal command, and wherein the operations further comprising parsing the verbal command to determine one or more information sources needed to formulate the audible reply.

* * * * *

UNITED STATES PATENT AND TRADEMARK OFFICE
CERTIFICATE OF CORRECTION

PATENT NO. : 10,629,190 B2
APPLICATION NO. : 15/808553
DATED : April 21, 2020
INVENTOR(S) : Frank Anthony Nuzzi It is certified that error appears in the above-identified patent and that said Letters Patent is hereby corrected as shown below:

In the Specification

In Column 10, Line 10, change "wife" to --wifi--.

Signed and Sealed this
Eleventh Day of August, 2020

Andrei Iancu
*Director of the United States Patent and Trademark Office*